US005741920A

United States Patent [19]

Eckhardt et al.

[11] Patent Number: 5,741,920

[45] Date of Patent: Apr. 21, 1998

[54] INHIBITION OF RE-ABSORPTION OF MIGRATING DYES IN THE WASH LIQUOR

[75] Inventors: Claude Eckhardt, Riedisheim, France; Dieter Reinehr, Kandern, Germany

[73] Assignee: Ciba Specialty Chemicals Corporation, Tarrytown, N.Y.

[21] Appl. No.: 469,596

[22] Filed: Jun. 6, 1995

Related U.S. Application Data

[62] Division of Ser. No. 259,651, Jun. 14, 1994, Pat. No. 5,462,564.

[30] Foreign Application Priority Data

| | | | |
|---|---|---|---|
| Jun. 19, 1993 | [GB] | United Kingdom | 9312693 |
| Dec. 8, 1993 | [GB] | United Kingdom | 9325117 |

[51] Int. Cl.$^6$ .......... C07F 13/00

[52] U.S. Cl. .......... 556/45; 556/34

[58] Field of Search .......... 556/34, 45

[56] References Cited

U.S. PATENT DOCUMENTS

| | | | |
|---|---|---|---|
| 3,173,956 | 3/1965 | Grinstead | 260/600 |
| 4,539,132 | 9/1985 | Oakes | 252/95 |
| 4,655,785 | 4/1987 | Reinert | 8/442 |
| 4,728,455 | 3/1988 | Rerek | 252/99 |
| 5,114,611 | 5/1992 | van Kralingen | 252/186.33 |
| 5,153,161 | 10/1992 | Kerschner | 502/167 |
| 5,194,416 | 3/1993 | Jureller | 502/167 |
| 5,227,084 | 7/1993 | Martens | 252/95 |
| 5,244,594 | 9/1993 | Favre | 252/186.33 |
| 5,246,612 | 9/1993 | van Dijk | 252/102 |
| 5,246,621 | 9/1993 | Favre | 252/186.33 |
| 5,314,635 | 5/1994 | Hage | 252/102 |
| 5,356,554 | 10/1994 | Delwel | 252/94 |

FOREIGN PATENT DOCUMENTS

| | | |
|---|---|---|
| 0162811 | 11/1985 | European Pat. Off. . |
| 0453356 | 10/1991 | European Pat. Off. . |
| 0538228 | 4/1993 | European Pat. Off. . |
| 2158454 | 11/1985 | United Kingdom . |
| 91/14694 | 10/1991 | WIPO . |
| 9114694 | 10/1991 | WIPO . |
| 9303838 | 3/1993 | WIPO . |

OTHER PUBLICATIONS

Boucher, J. inorg. nucl. chem., vol. 36, pp. 531–536 (1974).

Zhang et al., J. Am. Chem. Soc., vol. 112, pp. 2801–2803 (1990).

Lee et al., Tetrahedron Letters, vol. 32, No. 38, pp. 5055–5058 (1991).

Kamat et al., Journ. Indian Chem. Soc., vol. 46 (1969), pp. 345–347.

Chemical Abstracts 51: 6300h.

CAS Registry #s 138394–37–3; 25395–86–2; 133193–92–7.

*Primary Examiner*—Porfirio Nazario-Gonzalez

*Attorney, Agent, or Firm*—Kevin T. Mansfield

[57] ABSTRACT

A process for inhibiting the re-absorption of migrating dyes in the wash liquor comprises introducing into a wash liquor containing a peroxide-containing detergent, from 0.5 to 150 mg, per liter of wash liquor, of one or more manganese compounds having the formula (1), (2), (3), (4), (5), (6) or (7) as defined in the specification. The manganese compounds do not exhaust at all on to cotton, polyamide or polyester fibres so that the compounds cannot lead to fibre discolouration problems.

13 Claims, No Drawings

INHIBITION OF RE-ABSORPTION OF MIGRATING DYES IN THE WASH LIQUOR

This is a division of Ser. No. 08/259,651, filed Jun. 14, 1994, now U.S. Pat. No. 5,462,564.

The present invention relates to a process for inhibiting the re-absorption of migrating dyes in the wash liquor.

It is well known that various metal compounds, e.g. manganese complexes, are useful in detergents as catalysts for peroxides.

It has now been found that certain other manganese complexes, although effecting no apparent improvement in the bleaching power of peroxides, exert a pronounced bleaching effect on dirt or dyes in the wash bath. Moreover, these manganese complexes do not exhaust at all on to cotton, polyamide or polyester fibres so that the complexes cannot lead to fibre discolouration problems.

Accordingly, the present invention provides a process for inhibiting the re-absorption of migrating dyes in the wash liquor, comprising introducing into a wash liquor containing a peroxide-containing detergent, from 0.5 to 150, preferably from 1.5 to 75, especially from 7.5 to 40 mg, per liter of wash liquor, of one or more compounds having the formula (1), (2), (3), (4), (5), (6) or (7):

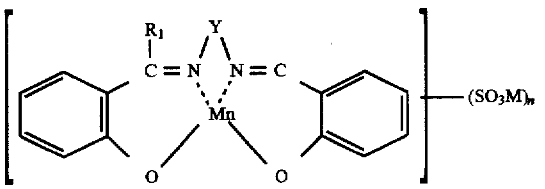
(1)

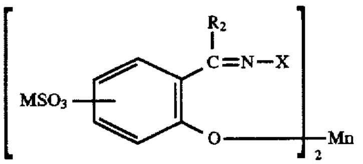
(2)

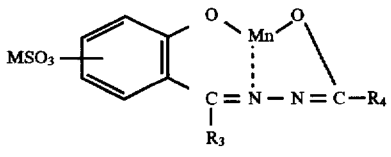
(3)

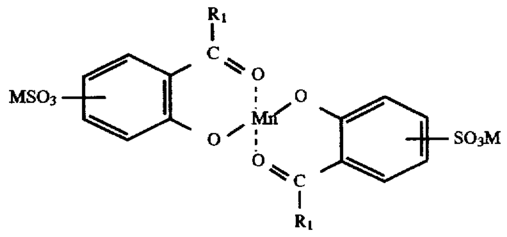
(4)

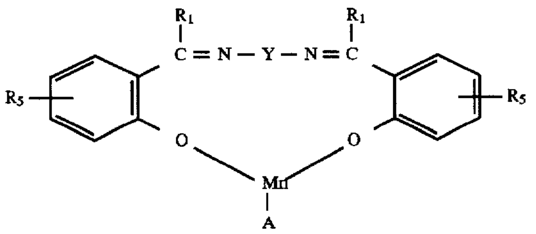
(5)

-continued

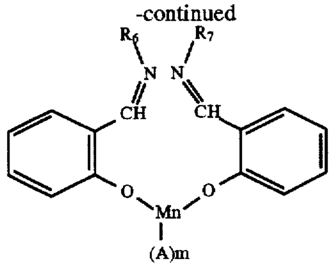
(6)

or

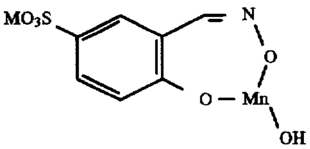
(7)

in which $R_1$, $R_2$, $R_3$ and $R_4$ are the same or different and each is hydrogen or optionally substituted alkyl, cycloalkyl or aryl; $R_5$ is hydrogen, alkyl or $SO_3M$; $R_6$ and $R_7$ are the same or different and each is NH—CO—$NH_2$, a group of formula

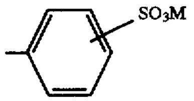

or a group of formula

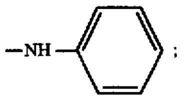
;

Y is optionally substituted alkylene or cyclohexylene; X is OH, $NH_2$, optionally substituted aryl or optionally substituted alkyl; n is 0, 1, 2 or 3; M is hydrogen, an alkali metal atom, ammonium or a cation formed from an amine; m is 0 or 1; and A is an anion.

When one or more of $R_1$, $R_2$, $R_3$, $R_4$, $R_5$ and X are optionally substituted alkyl, preferred alkyl groups are $C_1$–$C_8$-, especially $C_1$–$C_4$-alkyl groups. The alkyl groups may be branched or unbranched and may be optionally substituted, e.g. by halogen such as fluorine, chlorine or bromine, by $C_1$–$C_4$-alkoxy such as methoxy or ethoxy, by phenyl or carboxyl, by $C_1$–$C_4$-alkoxycarbonyl such as acetyl, or by a mono- or di-alkylated amino group.

When one or more of $R_1$, $R_2$, $R_3$, $R_4$ and $R_5$ are cycloalkyl, this may also be substituted, e.g. by $C_1$–$C_4$-alkyl or $C_1$–$C_4$-alkoxy.

When one or more of $R_1$, $R_2$, $R_3$, $R_4$, $R_5$ and X are optionally substituted aryl, they are preferably a phenyl or naphthyl group which may be substituted by $C_1$–$C_4$-alkyl, e.g. by methyl, ethyl, propyl, isopropyl, butyl, isobutyl, sec.-butyl or tert.-butyl, by $C_1$–$C_4$-alkoxy such as methoxy, ethoxy, propoxy, isopropoxy, butoxy, isobutoxy, sec.-butoxy or tert.-butoxy, by halogen such as fluorine, chlorine or bromine, by $C_2$–$C_5$-alkanoylamino, such as acetylamino, propionylamino or butyrylamino, by nitro, sulpho or by dialkylated amino.

When Y is alkylene, it is preferably a $C_2$–$C_4$-alkylene residue, especially a —$CH_2$—$CH_2$— bridge. Y may also be a $C_2$–$C_8$-alkylene residue which is interrupted by oxygen or, especially, by nitrogen, in particular the —$(CH_2)_3$—NH—$(CH_2)_3$— bridge.

Anions A include halide, especially chloride, sulphate, nitrate, hydroxy, methoxy, $BF_4$, $PF_6$, carboxylate, especially acetate, triflate or tosylate.

With respect to the compounds of formula (1), preferably each $R_1$ is hydrogen, Y is the ethylene bridge and n is 2, whereby one sulpho group is preferably present in each benzene ring, especially in para position to the oxygen atom.

In relation to the compounds of formula (2), preferably $R_2$ is hydrogen and X is OH.

With respect to the compounds of formula (3), preferred compounds are those in which $R_3$ is hydrogen and $R_4$ is hydrogen, methyl or, especially, phenyl. Especially preferred compounds are those in which the $SO_3M$ group is in para position to the oxygen atom.

With respect to the compounds of formula (4), preferred compounds are those in which $R_1$ is hydrogen, more especially those in which each $SO_3M$ group is in para position to the respective oxygen atom.

As to the compounds of formula (5), preferably $R_1$ is hydrogen or methyl, $R_5$ is hydrogen, methyl or $SO_3Na$ and is preferably in p-position with respect to the oxygen atom, Y is $-CH_2CH_2-$ or cyclohexylene and A is a chloride, acetate, hydroxy, methoxy or $PF_6$ anion.

In relation to the compounds of formula (6), preferably $R_6$ and $R_7$ are the same. The preferred anion, when present, is acetate.

In each of the compounds of formula (1) to (7), it is preferred that they are used in neutral form, i.e. that M, when present, is other than hydrogen, preferably a cation formed from an alkali metal, in particular sodium, or from an amine.

Moreover, in each of the compounds of formula (1) to (7), the respective benzene rings may contain, in addition to any sulpho group, one or more further substituents such as $C_1$–$C_4$-alkyl, $C_1$–$C_4$-alkoxy, halogen, cyano or nitro.

The manganese complexes of formula (2) to (7) are believed to be new compounds and, as such, form a further aspect of the present invention. They may be produced by known methods, e.g. by the methods analogous to those disclosed in U.S. Pat. No. 4,655,785 relating to similar copper complexes.

The present invention also provides a detergent composition comprising:

i) 5–90%, preferably 5–70% of A) an anionic surfactant and/or B) a nonionic surfactant;

ii) 5–70%, preferably 5–50%, especially 5–40% of C) a builder;

iii) 0.1–30%, preferably 1–12% of D) a peroxide; and iv) 0.005–2%, preferably 0.02–1%, especially 0.1–0.5% of E) a compound of formula (1) to (7) as defined above, each by weight, based on the total weight of the detergent.

The detergent may be formulated as a solid; or as a non-aqueous liquid detergent, containing not more than 5, preferably 0–1 wt. % of water, and based on a suspension of a builder in a non-ionic surfactant, as described, e.g., in GB-A-2158454.

Preferably, the detergent is in powder or granulate form.

Such powder or granulate forms may be produced by firstly forming a base powder by spray-drying an aqueous slurry containing all the said components, apart from the components D) and E); then adding the components D) and E) by dry-blending them into the base powder. In a further process, the component E) may be added to an aqueous slurry containing components A), B) and C), followed by spray-drying the slurry prior to dry-blending component D) into the mixture. In a still further process, component B) is not present, or is only partly present in an aqueous slurry containing components A) and C); component E) is incorporated into component B), which is then added to the spray-dried base powder; and finally component D) is dry-blended into the mixture.

The anionic surfactant component A) may be, e.g., a sulphate, sulphonate or carboxylate surfactant, or a mixture of these.

Preferred sulphates are alkyl sulphates having 12–22 carbon atoms in the alkyl radical, optionally in combination with alkyl ethoxy sulphates having 10–20 carbon atoms in the alkyl radical.

Preferred sulphonates include alkyl benzene sulphonates having 9–15 carbon atoms in the alkyl radical.

In each case, the cation is preferably an alkali metal, especially sodium.

Preferred carboxylates are alkali metal sarcosinates of formula $R-CO(R^1)CH_2COOM^1$ in which R is alkyl or alkenyl having 9–17 carbon atoms in the alkyl or alkenyl radical, $R^1$ is $C_1$–$C_4$ alkyl and $M^1$ is alkali metal.

The nonionic surfactant component B) may be, e.g., a condensate of ethylene oxide with a $C_9$–$C_{15}$ primary alcohol having 3–8 moles of ethylene oxide per mole.

The builder component C) may be an alkali metal phosphate, especially a tripolyphosphate; a carbonate or bicarbonate, especially the sodium salts thereof; a silicate; an aluminosilicate; a polycarboxylate; a polycarboxylic acid; an organic phosphonate; or an aminoalkylene poly (alkylene phosphonate); or a mixture of these.

Preferred silicates are crystalline layered sodium silicates of the formula $NaHSi_mO_{2m+1}.pH_2O$ or $Na_2Si_mO_{2m+1}.pH_2O$ in which m is a number from 1.9 to 4 and p is 0 to20.

Preferred aluminosilicates are the commercially-available synthetic materials designated as Zeolites A, B, X, and HS, or mixtures of these. Zeolite A is preferred.

Preferred polycarboxylates include hydroxypolycarboxylates, in particular citrates, polyacrylates and their copolymers with maleic anhydride.

Preferred polycarboxylic acids include nitrilotriacetic acid and ethylene diamine tetra-acetic acid.

Preferred organic phosphonates or aminoalkylene poly (alkylene phosphonates) are alkali metal ethane 1-hydroxy diphosphonates, nitrilo trimethylene phosphonates, ethylene diamine tetra methylene phosphonates and diethylene triamine penta methylene phosphonates.

The peroxide component D) may be any organic or inorganic peroxide compound, described in the literature or available on the market, which bleaches textiles at conventional washing temperatures, e.g. temperatures in the range of from 10° C. to 90° C. In particular, the organic peroxides are, for example, monoperoxides or polyperoxides having alkyl chains of at least 3, preferably 6 to 20, carbon atoms; in particular diperoxydicarboxylates having 6 to 12 C atoms, such as diperoxyperazelates, diperoxypersebacates, diperoxyphthalates and/or diperoxydedecanedioates, especially their corresponding free acids, are of interest. It is preferred, however, to employ very active inorganic peroxides, such as persulphate, perborate and/or percarbonate. It is, of course, also possible to employ mixtures of organic and/or inorganic peroxides.

The addition of the peroxides to the detergent is effected, in particular, by mixing the components, for example by means of screw-metering systems and/or fluidized bed mixers.

The detergents may contain, in addition to the combination according to the invention, one or more of fluorescent whitening agents, such as a bis-triazinylamino-stilbene-disulphonic acid, a bis-triazolyl-stilbene-disulphonic acid, a bis-styryl-biphenyl, a bis-benzofuranylbiphenyl, a bis-benzoxalyl derivative, a bis-benzimidazolyl derivative, a coumarine derivative or a pyrazoline derivative; soil suspending agents, for example sodium carboxymethylcellulose; salts for adjusting the pH, for example alkali or alkaline earth metal silicates; foam regulators, for example soap; salts for adjusting the spray drying and granulating properties, for example sodium sulphate; perfumes; and also, if appropriate, antistatic and softening agents; such as smectite clays; enzymes, such as amylases; photobleaching agents; pigments; and/or shading agents. These constituents should, of course, be stable to the bleaching system employed.

A particularly preferred detergent co-additive is a polymer known to be useful in preventing the transfer of labile dyes between fabrics during the washing cycle. Preferred examples of such polymers are polyvinyl pyrrolidones, optionally modified by the inclusion of an anionic or cationic substituent, especially those having a molecular weight in the range from 5000 to 60,000, in particular from 10,00 to 50,000. Preferably, such polymer is used in an amount ranging from 0.05 to 5%, preferably 0.2–1.7% by weight, based on the weight of the detergent.

The following Examples serve to illustrate the invention; parts and percentages are by weight, unless otherwise stated.

EXAMPLE 1

60 g of ethylenediamine are dropped into a solution of 277 g of salicylaldehyde in 500 ml of ethanol over 1 hour at 60° C. Stirring is continued at 60° C. for a further 2 hours and the precipitate so formed is filtered off. There are obtained 260 g of a yellow compound having the formula:

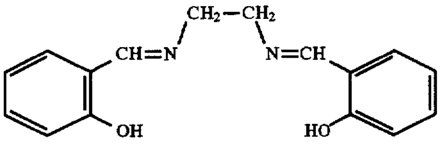

(101)

corresponding to a yield of 97% of theory.

To 13.4 g of the compound of formula (101) dissolved in 1000 ml of ethanol there are added 12.25 g of manganese-(II)-acetate.$4H_2O$. The dark brown solution so produced is stirred at 75° C. for 3 hours and then evaporated to dryness. The residue is dissolved in 1250 ml of water, filtered and the filtrate is treated with 58 g of NaCl. The precipitated dark brown product is filtered off and dried in vacuum. There are obtained 12.6 g of the compound having the formula:

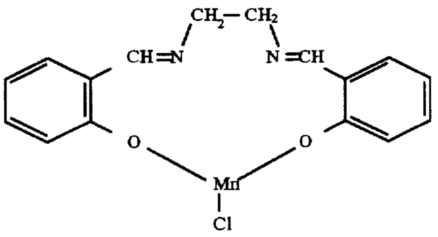

(102)

corresponding to a yield of 64% of theory.

Elemental analysis of the compound having the formula (102) and having the empirical formula $C_{16}H_{14}ClMnN_2O_2$.$1.92H_2O$ gives:

Req.% C 49.11; H 4.60; N 7.16; Cl 9.06; $H_2O$ 8.84; Mn 14.0.

Found % C 49.4; H 4.6; N 7.1; Cl 8.9; $H_2O$ 8.82; Mn 13.9.

EXAMPLE 2

The procedure described in Example 1 is repeated except that 14.1 g of manganese-(III)-acetate.$2H_2O$ are used instead of 12.25 g of manganese-(II)-acetate.$4H_2O$. After working up, there are obtained 16 g of the compound of formula (102) corresponding to a yield of 81.6% of theory.

EXAMPLES 3 TO 12

Using the procedure described in Example 1, the following compounds of formula (5A) are prepared:

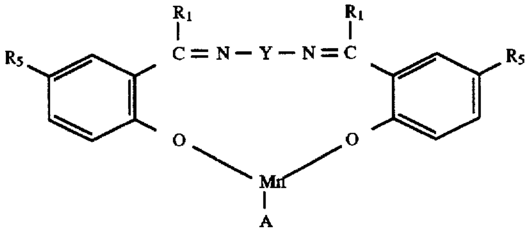

(5A)

EXAMPLE 3

(Compound 103)

$R_1$ is H; $R_5$ is H; Y is —$CH_2CH_2$—; and A is $CH_3COO$.

Elemental analysis of the compound having the formula (103) and having the empirical formula $C_{18}H_{17}MnN_2O_4$ gives:

Req.% C 56.8; H 4.5; N 7.4; Mn 14.5.

Found % C 56.7; H 4.6; N 7.3; Mn 14.6.

EXAMPLE 4

(Compound 104)

$R_1$ is H; $R_5$ is H; Y is —$CH_2CH_2$—; and A is $PF_6$.

Elemental analysis of the compound having the formula (104) and having the empirical formula $C_{16}H_{14}F_6MnN_2O_2P.2.12H_2O$ gives:

Req.% C 38.1; H 3.6; N 5.6; $H_2O$ 7.6; Mn 10.9.

Found % C 38.5; H 3.5; N 5.7; $H_2O$ 7.6; Mn 11.0.

EXAMPLE 5

(Compound 105)

$R_1$ is H; $R_5$ is H; Y is 1,2-cyclohexylene; and A is $CH_3COO$.

Elemental analysis of the compound having the formula (105) and having the empirical formula $C_{22}H_{23}MnN_2O_4.1.9H_2O$ gives:

Req.% C 56.4; H 5.8; N 6.0; $H_2O$ 7.3; Mn 11.7.

Found % C 56.2; H 5.8; N 5.9; $H_2O$ 7.3; Mn 11.5.

EXAMPLE 6

(Compound 106)

$R_1$ is $CH_3$; $R_5$ is H; Y is —$CH_2CH_2$—; and A is Cl.

Elemental analysis of the compound having the formula (106) and having the empirical formula $C_{18}H_{18}ClMnN_2O_4$ gives:

Req.% C 56.2; H 4.7; N 7.3; Mn 17.3.

Found % C 56.3; H 4.6; N 7.1; Mn 17.1.

EXAMPLE 7

(Compound 107)

$R_1$ is $CH_3$; $R_5$ is $CH_3$; Y is —$CH_2CH_2$—; and A is Cl.

Elemental analysis of the compound having the formula (107) and having the empirical formula $C_{20}H_{22}ClMnN_2O_2$. 4.25 $H_2O$.0.33 NaCl gives:

Req.% C 49.1;H 5.8; N 5.72; Cl 9.65; Mn 11.23.

Found% C 49.1; H 5.9; N 5.6; Cl 9.8; Mn 10.8.

EXAMPLE 8

(Compound 108)

$R_1$ is H: $R_5$ is $SO_3Na$; Y is —$CH_2CH_2$—: and A is Cl.

Elemental analysis of the compound having the formula (108) and having the empirical formula $C_{16}H_{12}ClMnN_2O_8S_2$. 3$H_2O$.1.2NaCl gives:

Req.% C 28.0; H 2.6; N 4.1; Mn 8.0; S 9.3.

Found % C 28.0; H 2.6; N 4.1; Mn 7.8; S 9.1.

EXAMPLE 9

(Compound 109)

$R_1$ is H; $R_5$ is $SO_3Na$; Y is —$CH_2CH_2$—; and A is OH.

Elemental analysis of the compound having the formula (109) and having the empirical formula $C_{16}H_{13}MnN_2Na_2O_9S_2$. 2.0$H_2O$ gives:

Req.% C 34.2; H 3.03; N 5.0; Mn 9.8.

Found % C 34.2; H 3.3; N 5.6; Mn 9.3.

EXAMPLE 10

(Compound 110)

$R_1$ is H; $R_5$ is $SO_3Na$; Y is —$CH_2CH_2$—; and A is $OCH_3$.

Elemental analysis of the compound having the formula (110) and having the empirical formula $C_{17}H_{15}MnN_2Na_2O_9S_2$ gives:

Req.% C 34.0; H 2.7; N 5.0; Mn 9.9; S 11.5.

Found% C 34.8; H 3.3; N 5.0; Mn 10.1; S 11.2.

EXAMPLE 11

(Compound 111)

$R_1$ is H; $R_5$ is $SO_3Na$; Y is 1,2-cyclohexylene; and A is $CH_3COO$.

Elemental analysis of the compound having the formula (111) and having the empirical formula $C_{22}H_{21}MnN_2Na_2O_{10}S_2$. 1.56$H_2O$ gives:

Req.% C 39.6; H 3.6; N 4.2; Mn 8.2; S 9.6.

Found % C 39.6; H 4.2; N 4.9; Mn 8.7; S 9.6.

EXAMPLE 12

(Compound 112)

$R_1$ is H; $R_5$ is $SO_3Na$; Y is 1,2-cyclohexylene; and A is Cl.

Elemental analysis of the compound having the formula (112) and having the empirical formula $C_{20}H_{18}ClMnN_2Na_2O_8S_2$. 2.5$H_2O$ gives:

Req.% C 32.2; H 3.1; N 3.8; Mn 7.4.

Found % C 32.2; H 3.1; N 3.8; Mn 7.2.

EXAMPLE 13

Using the procedure described in Example 1, the following compound of formula (113) is prepared:

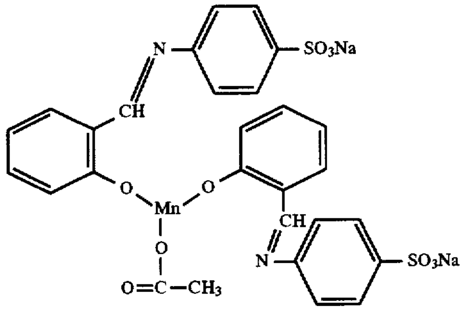

(113)

Elemental analysis of the compound having the formula (113) and having the empirical formula $C_{28}H_{21}MnN_2Na_2O_{10}S_2$.2.5$H_2O$ gives:

Req.% C 44.6; H 3.4; N 3.7; Mn 7.3; S 8.5.

Found % C 44.6; H 4.3; N 3.8; Mn 7.9; S 8.7.

EXAMPLE 14

Using the procedure described in Example 1, the following compound of formula (114) is prepared:

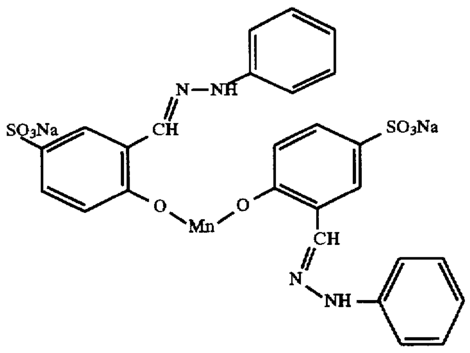

(114)

Elemental analysis of the compound having the formula (114) and having the empirical formula $C_{26}H_{20}MnN_4Na_2O_8S_2$. 3.45$H_2O$ gives:

Req.% C 42.0; H 3.65; N 7.5; Mn 7.4; S 8.6.

Found % C 42.0; H 4.6; N 7.4; Mn 7.4; S 8.6.

EXAMPLE 15

Using the procedure described in Example 1, the following compound of formula (115) is prepared:

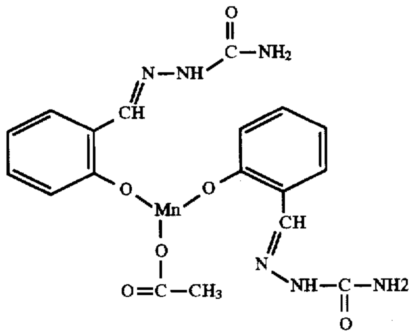

(115)

Elemental analysis of the compound having the formula (115) and having the empirical formula $C_{18}H_{19}MnN_6O_6$. 2.2$H_2O$ gives:

Req.% C 46.7; H 3.9; N 20.7; Mn 13.3.

Found % C 45.9; H 4.1; N 19.5; Mn 13.3.

EXAMPLE 16

Using the procedure described in Example 1, the following compound of formula (116) is prepared:

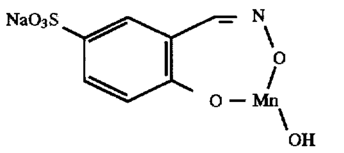

(116)

Elemental analysis of the compound having the formula (116) and having the empirical formula $C_7H_5MnNNaO_6S.2.5H_2O$ gives:

Req.% C 23.7; H 2.8; N 4.0; Mn 15.7; S 9.1.

Found % C 23.7; H 3.2; N 3.8; Mn 14.9.

EXAMPLES 17 and 18

The re-uptake of dyes, which have become detached from a coloured article during the washing process and re-absorbed on to goods which are also being washed and which are thereby discoloured, is evaluated using a test dye, as follows:

The following commercial brown dyestuff is tested at a concentration of 10 mg per liter of wash liquor:

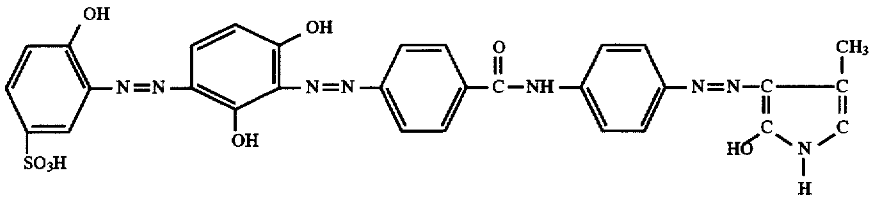

There is then added to this wash liquor, with stirring, in a concentration of 7.5 g. per liter of tap water, a detergent having the following composition:

6% Sodium alkylbenzenesulfonate (®Marlon A375);

5% Ethoxylated $C_{14}$-$C_{15}$ fatty alcohol (7 moles EO);

3% Sodium soap;

30% Zeolite A;

7.5% Sodium carbonate;

5% Sodium metasilicate ($5.H_2O$);

43.5 % Sodium sulphate.

The bath is then tested in a "®Linitest" beaker for 20 minutes at 30°, 40°, 50° or 60° C., respectively. After the addition, with stirring, directly before the treatment, of x % (see Table 1 below) of sodium perborate monohydrate, and/or of y % (see Table 1 below) of the following compound of formula (117), each based on the weight of the above detergent, the appearance of the bath is evaluated visually:

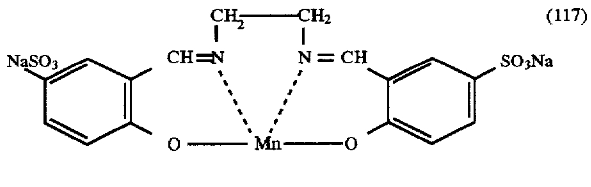

(117)

TABLE 1

| Example | Perborate x % | Compound (117) y % | Bath Appearance |
|---|---|---|---|
| Control | 0 | 0 | dark brown |
| Control | 2 | 0 | dark brown |
| Control | 14 | 0 | dark brown |
| Control | 0 | 0.2 | dark brown |
| Control | 0 | 0.5 | slight fade |
| 17 | 2 | 0.2 | high fade |
| 18 | 2 | 0.5 | very high fade |

The ratings are the same after the treatments at each of the four tested temperatures. They show that the combination of perborate and compound (117) causes a significant decomposition of the test dyestuff in the bath. Accordingly, in corresponding washing baths, very little undesired colouration can occur of textiles which are present in the bath, especially with the lower dye bath concentrations used in practice.

As is evident from Table 1, this effect cannot be obtained in the absence of compound (117) using concentrations of perborate, e.g., 14% by weight, conventionally used in detergents.

Similar results are obtained when the compound of formula (117) is replaced by a compound having one of the formulae (102) to (116).

EXAMPLES 19 and 20

The procedure described in Examples 17 and 18 is repeated except that bleached cotton fabric, in an amount of 50 g. per liter of wash bath, is also added.

After the wash treatment, over 20 minutes at 30° C., the fabric pieces are rinsed, dried and quickly ironed and their brightness Y is determined using an ICS SF 500 Spectrophotometer.

The difference between the fabric washed without the addition of a dye, and the fabric washed with the addition of the brown dye used in Examples 17 and 18, viz. "ΔY without bleach system" serves as a control rating for the discolouration.

The effectivity of a bleaching system is determined from the equation:

$$\text{Effectivity in \%} = \frac{\Delta Y \text{ without bleach} - \Delta Y \text{ with bleach}}{\Delta Y \text{ without bleach}} \times 100$$

The results obtained are set out in Table 2:

TABLE 2

| Example | Perborate x % | Compound (117) y % | Effectivity |
|---|---|---|---|
| Control | 0 | 0 | 0% |
| Control | 2 | 0 | 8% |

TABLE 2-continued

| Example | Perborate x % | Compound (117) y % | Effectivity |
|---|---|---|---|
| 19 | 2 | 0.2 | 71% |
| 20 | 2 | 0.5 | 76% |

Similar results are obtained when the compound of formula (117) is replaced by a compound having one of the formulae (102) to (116).

Likewise, similar results are obtained when Example 19 is repeated except that the brown dyestuff of formula:

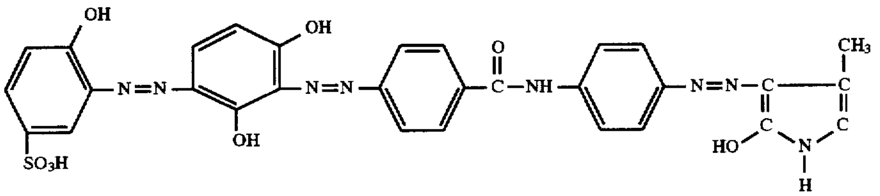

is replaced by one of the following dyestuffs:

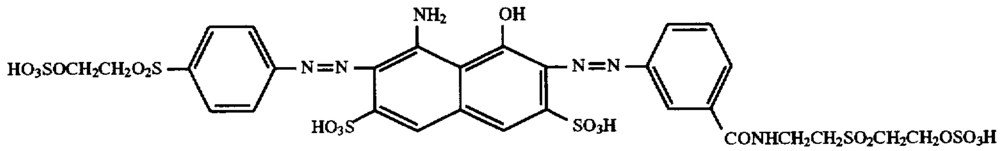

or

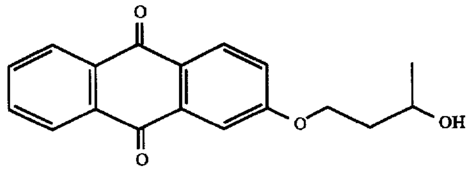

EXAMPLES 21 and 22

The procedure described in Examples 19 and 20 is repeated except that percarbonate is used instead of perborate.

The results obtained are set out in the following Table 3:

TABLE 3

| Example | Percarbonate x % | Compound (117) y % | Effectivity |
|---|---|---|---|
| Control | 0 | 0 | 0% |
| Control | 2 | 0 | 31% |
| 21 | 2 | 0.2 | 61% |
| 22 | 2 | 0.5 | 72% |

Similar results are obtained when the compound of formula (117) is replaced by a compound having one of the formulae (102) to (116).

EXAMPLE 23

The procedure described in Examples 19 and 20 is repeated except that there is also added to the bath z % (see Table 4) of polyvinyl pyrrolidone (PVP), as ®Sokalan HP53, having an average molecular weight of about 40,000, based on the weight of the detergent.

The results are set out in the following Table 4:

TABLE 4

| Example | Perborate x % | Compound (117) y % | PVP z % | Effectivity |
|---|---|---|---|---|
| Control | 0 | 0 | 0 | 0% |
| Control | 2 | 0 | 0 | 8% |
| 23 | 2 | 0.2 | 0.5 | 78% |

Similar results are obtained when the compound of formula (117) is replaced by a compound having one of the formulae (102) to (116).

EXAMPLE 24

The procedure described in Examples 21 and 22 is repeated except that there is also added to the bath z % (see Table 5) of polyvinyl pyrrolidone (PVP), as ®Sokalan HP53, having an average molecular weight of about 40,000, based on the weight of the detergent.

The results are set out in the following Table 5:

TABLE 5

| Example | Percarbonate x % | Compound (117) y % | PVP z % | Effectivity |
|---|---|---|---|---|
| Control | 0 | 0 | 0 | 0% |
| Control | 2 | 0 | 0 | 31% |
| 24 | 2 | 0.2 | 0.5 | 74% |

Similar results are obtained when the compound of formula (117) is replaced by a compound having one of the formulae (102) to (116).

EXAMPLE 25

25 g. of bleached cotton fabric are washed for 15 minutes in 200 ml. of a bath containing 1.5 g. of a detergent having the following composition (ECE standard washing powder):

8.0% Sodium ($C_{11.5}$)alkylbenzenesulphonate;

2.9% Tallow-alcohol-tetradecane-ethyleneglycolether (14 moles EO);

3.5% Sodium soap;

43.8% Sodium triphosphate;

7.5% Sodium silicate;

1.9% Magnesium silicate;

1.2% Carboxymethylcellulose;

0.2% EDTA;

21.2% Sodium sulphate; and 9.8% Water.

After rinsing and drying, the fabric is ironed and evaluated spectrophotometrically using an ICS SF 500 Spectrophotometer.

Washing trials at 30°, 60° and 90° C. indicated, in each case, that the resulting spectra are identical in the visible range, viz. between 400 and 700 nm, irrespective of whether the trials are conducted with the above detergent tel quel, or with the addition of 0.2% by weight of compound (117).

This confirms the visual findings, i.e. that compound does not exhaust on to, and thus cannot impair the appearance of cotton articles.

The same trials are repeated but using polyamide (Lilion) -tricot or polyester fabric instead of cotton. Again, with these textile types, there is no undesired discolouration of the washed articles by compound (117) itself.

Similar results are obtained when the compound of formula (117) is replaced by a compound having one of the formulae (102) to (116).

We claim:

1. A compound having the formula (2), (3), (4), (5), (6) or (7):

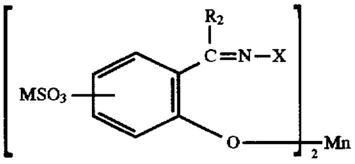

(2)

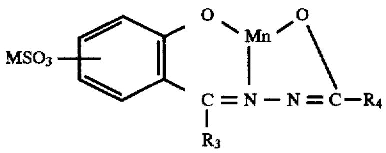

(3)

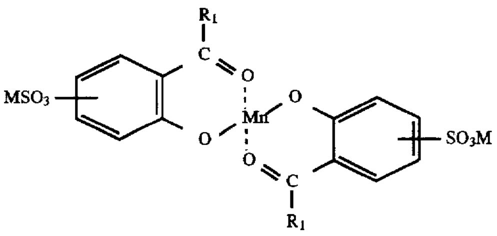

(4)

-continued

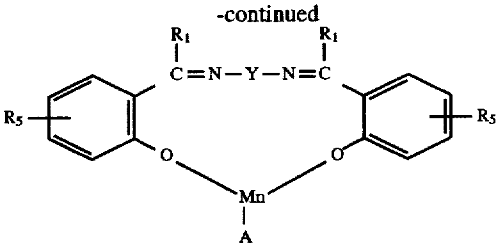

(5)

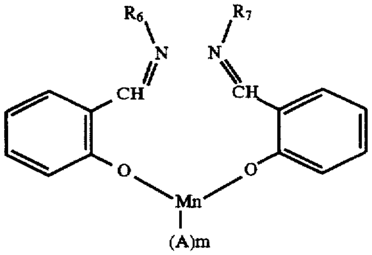

(6)

or

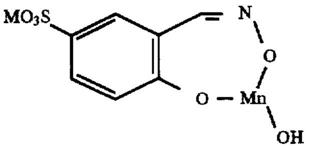

(7)

in which $R_1$, $R_2$, $R_3$ and $R_4$ are the same or different and each is hydrogen or optionally substituted alkyl, cycloalkyl or aryl; $R_5$ is hydrogen, alkyl or $SO_3M$; $R_6$ and $R_7$ are the same or different and each is NH—CO—$NH_2$, a group of formula

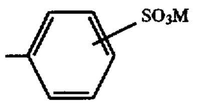

or a group of formula

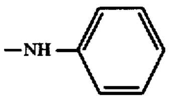

;

Y is optionally substituted alkylene or cyclohexylene; X is OH, $NH_2$, optionally substituted aryl or optionally substituted alkyl; M is hydrogen, an alkali metal atom, ammonium or a cation formed from an amine; m is 0 or 1; and A is an anion, provided that, in the compounds of formula (5), those compounds are excluded in which A is Cl, each $R_1$ is H and each $R_5$ is H; or A is Cl, each $R_1$ is H and each $R_5$ is 4-$CH_3$; or A is Cl, each $R_1$ is H and each $R_5$ is 4-sec.-$C_4H_9$; or A is Cl, each $R_1$ is $CH_3$ and each $R_5$ is H; or A is $PF_6$ one $R_1$ is H and the other is phenyl and each $R_5$ is H; or A is $PF_6$ one $R_1$ is H and the other is phenyl and each $R_5$ is 2-butyl.

2. A compound according to claim 1 having the formula (2).

3. A compound according to claim 1 having the formula (3).

4. A compound according to claim 1 having the formula (4).

5. A compound according to claim 1 having the formula (5).

6. A compound according to claim 1 having the formula (6).

7. A compound according to claim 1 having the formula (7).

8. A compound according to claim 2 having the formula (2) in which $R_2$ is hydrogen and X is OH.

9. A compound according to claim 3 having the formula (3) in which $R_3$ is hydrogen, $R_4$ is phenyl and the $SO_3M$ group is in the para position with respect to the oxygen atom.

10. A compound according to claim 4 having the formula (4) in which $R_1$ is hydrogen and each $SO_3M$ group is in the para position with respect to the oxygen atom.

11. A compound according to claim 5 having the formula (5) in which $R_1$ is hydrogen or methyl, $R_5$ is hydrogen, methyl or $SO_3M$, Y is $—CH_2CH_2—$ or cyclohexylene and A is a chloride, acetate, hydroxy, methoxy or $PF_6$ anion.

12. A compound according to claim 11 in which $R_5$ is in the para position with respect to the oxygen atom.

13. A compound according to claim 6 having the formula (6) in which $R_6$ and $R_7$ are the same, m is 1 and A is the acetate anion.

* * * * *